United States Patent
Tatarinov et al.

(10) Patent No.: US 10,619,945 B2
(45) Date of Patent: Apr. 14, 2020

(54) COOLING ARRANGEMENT, FLUID COLLECTOR FOR COOLING ARRANGEMENT, AND METHOD OF PRODUCING A FLUID COLLECTOR

(71) Applicant: Benteler Automobiltechnik GmbH, Paderborn (DE)

(72) Inventors: Konstantin Tatarinov, Bielefeld (DE); Edvin List Clausen, Løjt Kirkeby Åbenrå (DK)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 15/970,523

(22) Filed: May 3, 2018

(65) Prior Publication Data

US 2018/0320996 A1 Nov. 8, 2018

(30) Foreign Application Priority Data

May 5, 2017 (DE) .................... 10 2017 109 708

(51) Int. Cl.
*F28F 9/02* (2006.01)
*H01M 10/6554* (2014.01)
(Continued)

(52) U.S. Cl.
CPC .............. *F28F 9/0226* (2013.01); *F28D 1/00* (2013.01); *F28D 1/05366* (2013.01);
(Continued)

(58) Field of Classification Search
CPC ........ F28F 9/0226; F28F 9/0248; F28F 9/165; F28F 9/0246; F28F 9/0256; F28F 9/10;
(Continued)

(56) References Cited

U.S. PATENT DOCUMENTS 4,614,231 A * 9/1986 Proctor ................... F25B 39/02
165/153
4,651,821 A * 3/1987 Moranne ............. F28D 1/05333
165/175
(Continued)

FOREIGN PATENT DOCUMENTS

DE 102014106941 11/2015
DE 102015007975 12/2015
(Continued)

OTHER PUBLICATIONS

Handling et al, U.S. Pat. No. 8,201,861, Jun. 19, 2012, 2011/0121587, May 26, 2011.
(Continued)

*Primary Examiner* — Tho V Duong
(74) *Attorney, Agent, or Firm* — Henry M. Feiereisen LLC

(57) ABSTRACT

A cooling arrangement for a battery box includes a plate-shaped heat exchanging element, a cooling channel secured to the heat exchanging element, and a fluid collector for collecting or feeding a fluid into the cooling channel. The fluid collector includes a volume region and has a receiving opening on a side proximate to the cooling channel for introduction of the cooling channel to thereby fluidly connect the volume region with the cooling channel. A sealing element and a clamping element are arranged on an outside of the fluid collector at the receiving opening, with the clamping element being traversed by the cooling channel. A clamping tab is arranged above or below the receiving opening in surrounding relationship to the sealing element and the clamping element to thereby secure the cooling channel immovably to the fluid collector.

16 Claims, 6 Drawing Sheets

(51) Int. Cl.
*H01M 10/625* (2014.01)
*F28D 1/00* (2006.01)
*H01M 10/6567* (2014.01)
*F28D 1/053* (2006.01)
*F28F 9/16* (2006.01)
*H01M 10/613* (2014.01)
*H01M 10/6556* (2014.01)
*F28D 21/00* (2006.01)

(52) U.S. Cl.
CPC ............ *F28F 9/0248* (2013.01); *F28F 9/165* (2013.01); *H01M 10/613* (2015.04); *H01M 10/625* (2015.04); *H01M 10/6554* (2015.04); *H01M 10/6556* (2015.04); *H01M 10/6567* (2015.04); *F28D 2021/0029* (2013.01); *F28D 2021/0043* (2013.01); *F28F 2275/08* (2013.01); *F28F 2275/10* (2013.01); *H01M 2220/20* (2013.01)

(58) Field of Classification Search
CPC ............ F28F 2220/00; H01M 10/613; H01M 10/625; H01M 10/6554; H01M 10/6556; H01M 10/6567; F28D 1/00; F28D 1/105366
See application file for complete search history.

(56) References Cited

U.S. PATENT DOCUMENTS

| | | | | |
|---|---|---|---|---|
| 5,238,059 A * | 8/1993 | Smith | ................... | F28F 9/0224 165/153 |
| 5,246,066 A * | 9/1993 | Morgan | ................... | F28F 9/02 165/153 |
| 5,538,079 A * | 7/1996 | Pawlick | .............. | F28D 1/05366 165/153 |
| 5,685,075 A * | 11/1997 | Kato | ................... | B23K 1/0012 29/890.054 |
| 6,296,051 B1 * | 10/2001 | Sahnoun | ............... | F28F 9/0226 165/153 |
| 7,032,656 B2 * | 4/2006 | Lamich | ................. | F28D 1/0535 165/149 |
| 9,316,450 B2 * | 4/2016 | Engelhardt | ................ | F28F 9/02 |
| 2002/0050348 A1 * | 5/2002 | Watanabe | ........... | F28D 1/05366 165/178 |
| 2005/0109492 A1 * | 5/2005 | Kroetsch | ........... | F28D 1/05366 165/149 |
| 2006/0162908 A1 * | 7/2006 | Tippmann | ........... | A47J 37/0694 165/119 |
| 2007/0068660 A1 * | 3/2007 | Hassdenteufel | ...... | F28D 1/0435 165/140 |
| 2011/0109122 A1 | 5/2011 | Clausen et al. | | |
| 2012/0119526 A1 | 5/2012 | Clausen et al. | | |
| 2016/0091252 A1 | 3/2016 | Hofmann et al. | | |

FOREIGN PATENT DOCUMENTS

DE    102014219387         3/2016
EP    0112513 A2 *  7/1984    ......... F28D 1/05333

OTHER PUBLICATIONS

Hilgenberg et al, U.S. Pat. No. 8,702,149, Apr. 22, 2014, 2013/0154300, Jun. 20, 2013.

* cited by examiner

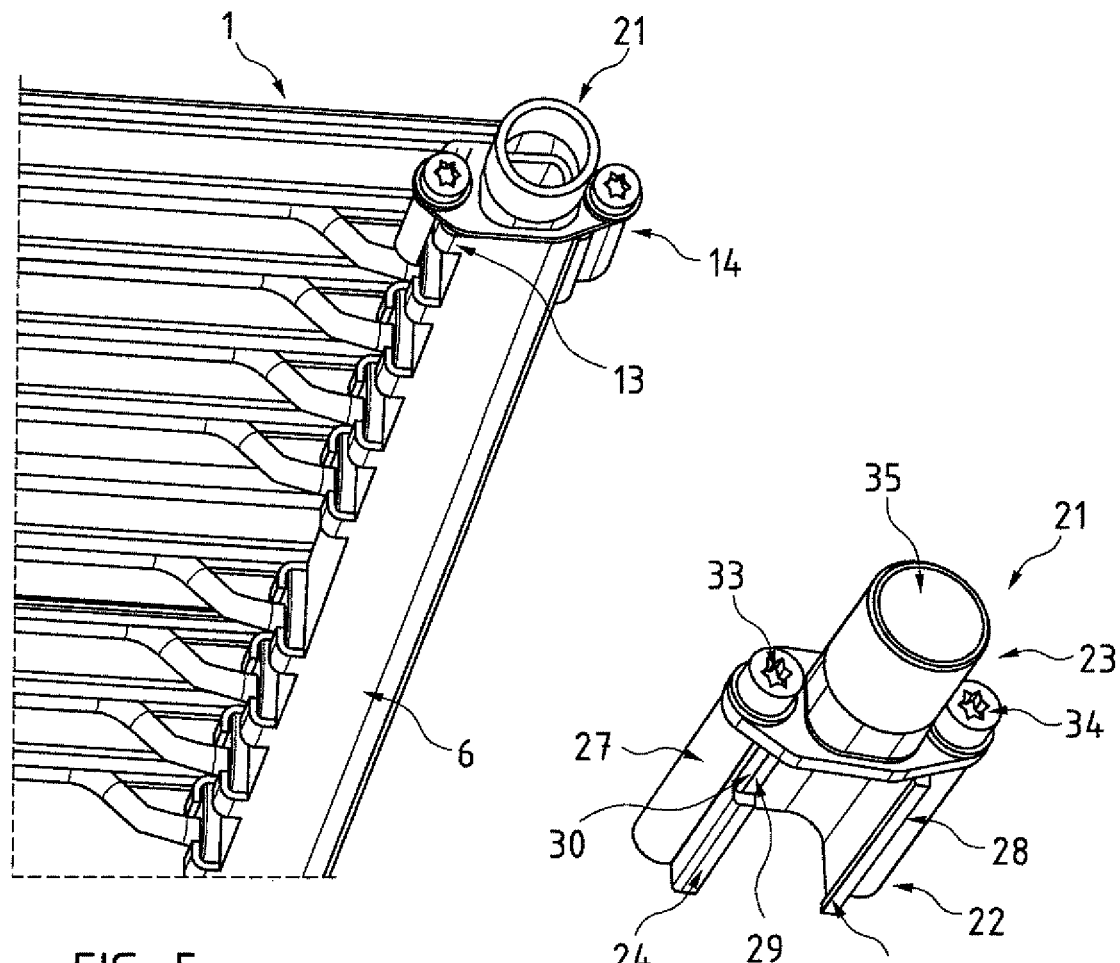
FIG. 5a
FIG. 5b
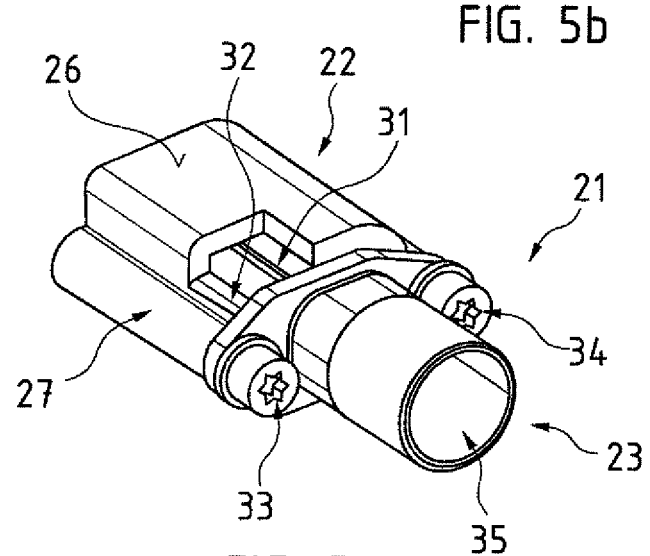
FIG. 5c

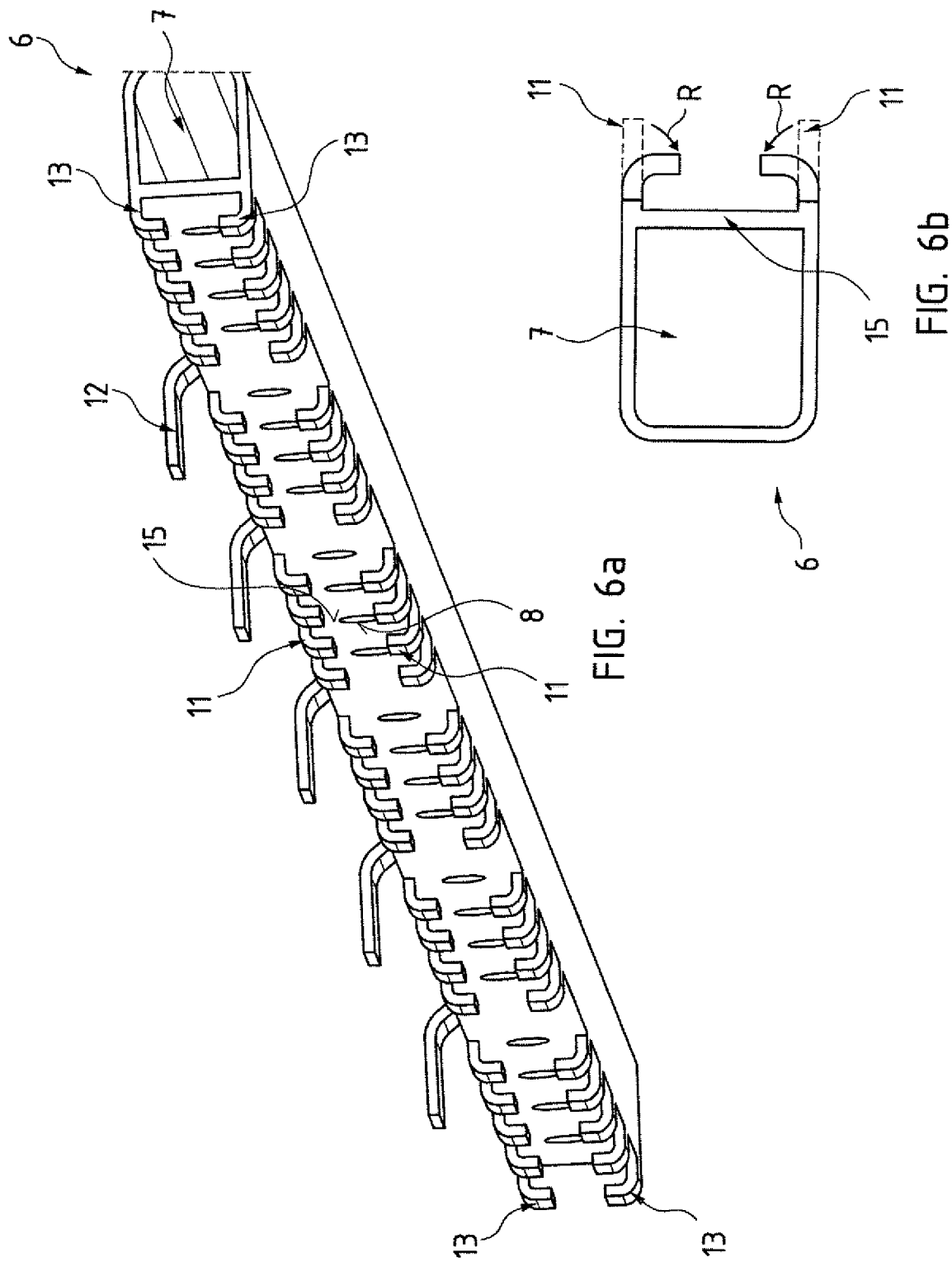

COOLING ARRANGEMENT, FLUID COLLECTOR FOR COOLING ARRANGEMENT, AND METHOD OF PRODUCING A FLUID COLLECTOR

CROSS-REFERENCES TO RELATED APPLICATIONS

This application claims the priority of German Patent Application, Serial No. 10 2017 109 708.2, filed May 5, 2017, pursuant to 35 U.S.C. 119(a)-(d), the disclosure of which is incorporated herein by reference in its entirety as if fully set forth herein.

BACKGROUND OF THE INVENTION

The present invention relates to a cooling arrangement, fluid collector for a cooling arrangement, and to a method of producing a fluid collector.

The following discussion of related art is provided to assist the reader in understanding the advantages of the invention, and is not to be construed as an admission that this related art is prior art to this invention.

A cooling arrangement can find application for maintaining battery assemblies in a battery box, for example for a motor vehicle, at moderate temperature to attain optimum operativeness. During operation, heat must be dissipated to prevent overheating and ensure operativeness. It is known to use heat exchanging systems in order to control the temperature of a battery assembly in a battery box. Oftentimes, this involves the use of a fluid which is conducted through an arrangement of cooling channels on or in the battery box and dissipates heat generated in the battery box. Supply of fluid is realized via fluid collectors by which the fluid is distributed via individual channels and united again when leaving the channels. The connection of the cooling channels with the fluid collector poses particular challenges because of the need for a fluidtight and gastight connection and, at the same time, the demand for a simple assembly of the cooling arrangement. In addition, weight and cost-effective production of a cooling arrangement are factors to be considered.

It would therefore be desirable and advantageous to address these problems and to obviate other prior art shortcomings.

SUMMARY OF THE INVENTION

According to one aspect of the present invention, a cooling arrangement for a battery box includes a plate-shaped heat exchanging element, a cooling channel secured to the heat exchanging element, a fluid collector for collecting or feeding a fluid into the cooling channel, the fluid collector including a volume region and having a receiving opening on a side proximate to the cooling channel for insertion of the cooling channel to thereby fluidly connect the volume region with the cooling channel, a sealing element arranged on an outside of the fluid collector at the receiving opening, a clamping element arranged on the outside of the fluid collector at the receiving opening and traversed by the cooling channel, and a clamping tab arranged above or below the receiving opening in surrounding relationship to the sealing element and the clamping element to thereby secure the cooling channel immovably to the fluid collector.

To ensure clarity, it is necessary to establish the definition of several important terms and expressions that will be used throughout this disclosure.

The term "plate-shaped heat exchanging element" relates to a structure which in two spatial directions has a substantially greater extension than in a third spatial direction. The plate shape is used here in a generic sense and is not limited to flat constructions with planar surface but can equally cover constructions with attached elements or structures, such as ribs, connections, or flanges for example.

A heat exchanging element may, for example, involve an aluminum sheet or aluminum profile that is produced by an extrusion process. The presence of aluminum material effects a particularly good heat conduction between battery elements, arranged in a battery box, and the cooling channels. The use of an extrusion process provides great flexibility as far as design options are concerned. The heat exchanging element may also be made of several joined elements or profiles to allow scaling of the cooling arrangement. The heat exchanging element may be part of the battery box, e.g. configured as bottom, lid, side wall or intermediate wall.

The cooling channel extends substantially along a longitudinal axis of the heat exchanging element. Of course, a cooling arrangement may have several cooling channels which may be arranged side-by-side in parallel relationship from one axial end of the heat exchanging element to the other end thereof. The cooling channels may also be arranged in a meandering configuration.

The fluid collector may be arranged on an axial end of the heat exchanging element and fluidly connected to the cooling channel or cooling channels. Provision may also be made to arrange a fluid collector at each axial end of the heat exchanging element so that fluid may be distributed via a fluid collector to the cooling channels. As the cooling channels are flowed through by fluid along the heat exchanging element, heat is absorbed by the fluid which drains on the opposite end into the corresponding fluid collector to collect the fluid volumes of the individual channels in a volume region for subsequent discharge.

When provided on one end only of the heat exchanging element, a fluid collector assumes the function of supply and discharge of fluid and includes two corresponding volume regions. The cooling channels have in this configuration the shape of a loop which initially lead away from the fluid collector and then return back to the fluid collector again. Any concrete configuration of the channel design and cooling arrangement is generally dependent on existing installation space and constructive design of the battery box.

Each cooling channel feeds into a receiving opening of the fluid collector. As a result, the volume region of the fluid collector is fluidly connected with the cooling channel, so that fluid is able to directly flow from the cooling channel into the volume region.

The cooling channel may be configured in many different ways. One example involves a configuration of the cooling channel in the form of thin tubes with a wall thickness of equal to or smaller than 0.5 millimeters. The cross section of the cooling channel may also be randomly selected. It is also conceivable to bundle individual channels to form the cooling channels or to use a channel structure with several bores. The receiving opening can be suited to the particular design of the cooling channel.

The cooling channel extends through a sealing element and clamping element arranged outside of the fluid collector at the receiving opening. Arranged above or below the receiving opening is a clamping tab on the fluid collector, with the clamping tab surrounding the sealing element and the clamping element to thereby hold the cooling channel immovably on the fluid collector. The clamping tab is bent in the direction of the receiving opening and pressed against the clamping element. As a result, the clamping element and the sealing element are clamped between clamping tab and an outer wall of the fluid collector and pressed against the outer wall.

The arrangement of the clamping tab can be realized in many ways. For example, a clamping tab may be arranged above and below the receiving opening, with the clamping element and the sealing element being embraced in part from above and from below by the respective clamping tabs. Another example involves the presence of two clamping tabs above the receiving opening and below the receiving opening to completely embrace the clamping element and the sealing element on both sides next to the cooling channel. These are only two examples of many design options available to an artisan.

According to another advantageous feature of the present invention, the sealing element can be made of malleable material which is fluidtight and gastight, wherein the material can be an elastomer or polymer. For example, the sealing element may be an O ring or an X ring or the like.

According to another advantageous feature of the present invention, the clamping element can be made of a stiff material which is fluidtight and gastight. Advantageously, the clamping element can be made of metal or may involve a forged or extruded structure of aluminum or steel. The clamping element may also involve a structure of plastic which may be made by an injection molding process.

The pressing force, generated by the clamping tabs, is transmitted by the clamping element onto the sealing element which deforms under pressure. As a result, the fluid collector and the cooling channel or channels are sealed off against the surroundings in a fluidtight and gastight manner. In addition, the deformation of the sealing element reduces its inner diameter, thereby realizing a press fit between the cooling channel and the sealing element, so that the cooling channel is held captive on the fluid collector.

As a result of this type of connection between the cooling channel and the fluid collector, many benefits derive. There is no need for cumbersome and expensive joining processes like welding, on one hand. The cooling channel can then be designed thinner and with very slight wall thickness (smaller than or equal to 0.5 millimeter) and therefore designed lighter and in a weight-saving manner. Also, the need for threads and screws, provided for a threaded engagement between heat exchanging element and fluid collector, can be eliminated, thereby again promoting lightweight construction. The sealing element may involve commercially available and cost-effective elastomer rings, thus further reducing costs as opposed to the use of expensive special seals. Finally, assembly is greatly simplified, as initially the cooling channel can be secured to the fluid collector, as described, and then the cooling channel can be connected with the heat exchanging element. It is hereby possible at the same time to compensate during assembly manufacture-related tolerances between the individual components. A further advantage involves the suppression of vibrations between the cooling channel and the fluid collector by the press fit during operation.

According to another advantageous feature of the present invention, the sealing element can be arranged at the receiving opening and can be embraced by the clamping element, with the clamping element and a wall of the fluid collector in surrounding relation to the receiving opening defining a hollow space in which the sealing element is arranged. In this way, the space in which the sealing element can undergo deformation is limited and an, elastic tension can be introduced into the sealing element so as to assist in the securement of the cooling channel.

According to another advantageous feature of the present invention, the sealing element and the clamping element can jointly form a single-piece structure. The sealing element may be bonded onto the clamping element or injection-molded or vulcanized onto the clamping element. Such a configuration has the advantage that only one structure needs to be arranged during assembly. Also, the possibility of unwanted shift of both elements relative to one another during assembly is prevented.

According to another advantageous feature of the present invention, a fishplate can be formed in one piece with and made of same material as the fluid collector for connecting the fluid collector with the heat exchanging element. As a result, the fluid collector can be connected to the heat exchanging element, suitably via the fishplate, by a form fit and/or material joint, e.g. by bonding, soldering, welding, riveting, bolting and the like. Depending on the design of the fishplate, the installation space can be optimally utilized in order to mount the fluid collector to the heat exchanging element.

According to another advantageous feature of the present invention, the cooling channel can be connected to the heat exchanging element by a form fit and/or material joint.

According to another advantageous feature of the present invention, a holder can be formed in one piece with and made of same material as the heat exchanging element for receiving the cooling channel. The cooling channel can be inserted or snapped into the holder. In this way, the assembly of the cooling arrangement is greatly simplified. A material joint in the form of a bonding or welding may also be contemplated, optionally in addition. The holder for the cooling channel may also be used to further stiffen the heat exchanging element or the battery box.

It is also conceivable to arrange a heat conducting layer, e.g. a heat conducting paste, between the holder and the cooling channel, so as to further enhance heat transfer between the heat exchanging element and the cooling channel.

According to another advantageous feature of the present invention, the volume region can have a cross section which is round or polygonal or varies over a length of the volume region. In particular, the volume region can have a variable diameter or a variable cross sectional configuration. A round cross section of the volume region enhances flow dynamics and is easier to work on during production of the fluid collector. However, the installation space for example may dictate the need for a polygonal, e.g. rectangular or trapezoidal or any other appropriate cross section. To utilize the available installation space in an optimum manner, the provision of a variable cross section over the length of the fluid collector may be beneficial so as to best suit the installation space.

According to another advantageous feature of the present invention, the fluid collector can be made in one piece and uniformly produced of aluminum alloy, in particular by an extrusion process. The light weight of aluminum promotes lightweight construction of the cooling arrangement. An extruded aluminum profile renders the fluid collector fluidtight per se. The fluid collector can be configured so as to extend in any length in the absence of a seam along an axial end of the heat exchanging element. Thus, any length of the fluid collector can easily be produced to best suit various dimensions of a battery box or of the heat exchanging element.

According to another advantageous feature of the present invention, the clamping tab, the fishplate, and the receiving opening can be produced by mechanically processing an extruded profile. Thus, again use is being made of the easy handling capability of the aluminum material and the design options provided by the extrusion process. The term "mechanically processing" relates hereby to a process, involving e.g. punching, cutting, bending or machining.

According to another advantageous feature of the present invention, an end piece can be attached to an end of the fluid collector to close off the fluid collector. An end piece is provided to couple the fluid collector with a line for supply or discharge of fluid. The end-side disposition enhances flow dynamics. When providing a feed or discharge line on one end only, the other end may be sealed, for example, by a simple plug or by a modified end piece without connection for a line.

According to another advantageous feature of the present invention, the end piece can include a connecting portion having a threaded sleeve and can be attached to the end of the fluid collector. A further clamping tab can be provided to captivate the connecting portion of the end piece. The end piece can further include a fitting for connection to a fluid supply line or fluid discharge line, with the fitting being threadably engaged via the threaded sleeve to the connecting portion. An advantage of such a construction resides in the fact that the threaded sleeve does not have to be provided on the fluid collector itself. Thus, when the fluid collector is an extruded profile, there is no need to form the threaded sleeve conjointly during extrusion and to remove redundant pieces, representing process steps that would increase production costs.

Assembly can be implemented in a simple manner by holding the connecting portion captivated on the fluid collector through use of appropriate clamping tabs. The connecting portion may hereby have undercuts or recesses in which the clamping tabs engage, or which are traversed by the clamping tabs. The fitting is provided to connect or affix a fluid supply line or fluid discharge line in a simple manner onto the attachment provided for this purpose.

According to another aspect of the present invention, a fluid collector is made from an extruded aluminum profile and includes a volume region having a wall formed with a receiving opening, and a clamping tab arranged above or below the receiving opening and projecting in a direction away from the volume region and towards the receiving opening for securing a cooling channel in the receiving opening.

The fluid collector can find application advantageously in a cooling arrangement, as described above. Function, design and benefits of the individual components of the fluid collector have been discussed above and are not repeated again for sake of simplicity.

The clamping tab can be bent about the sealing element and the clamping element, so as to press and clamp the sealing element and the clamping element against the fluid collector.

According to another advantageous feature of the present invention, a fishplate can be provided for connection of the fluid collector to a further structure, in particular a heat exchanging element.

According to another advantageous feature of the present invention, an end piece can be attached to an end of the fluid collector, and a further clamping tab can be provided for securing the fluid collector to the end piece.

According to another advantageous feature of the present invention, the volume region is defined by a longitudinal axis and can have a cross section which varies in a direction of the longitudinal axis.

According to yet another aspect of the present invention, a method of producing a fluid collector includes providing an extruded aluminum profile with a volume region and a flange which extends from the volume region in a direction away from the volume region, forming a receiving opening in a wall of the volume region of the aluminum profile in neighboring relationship to the flange, and mechanically processing the flange to form a clamping tab above or below a position of the receiving opening.

The extruded aluminum profile can be produced as continuous profile and cut to size into individual profiles, with the length of the profiles being suited, for example, to the dimensions of the battery box or the heat exchanging element to which the profile is to be installed. The basic shape of the volume region is established already during extrusion. The cross section can, basically, be randomly selected. Provision of a round cross section is beneficial as far as flow dynamics are concerned, although other configurations such as polygons or formed depressions can be produced, when the available installation space dictate such designs. Need for more than one volume region can easily be satisfied by producing intermediate walls during extrusion.

The receiving opening is formed at a location where the cooling channel of the cooling arrangement is intended. The disposition of the cooling channel depends on technical requirement and other constraints. The position of the receiving opening can thus be precisely suited to the requirements and selected in almost any manner. This renders the production process and the fluid collector economically extremely viable, since an extrusion profile can be best suited to the various constructive demands in a very simple manner. Mechanical processing is hereby to be understood as processes that may involve punching, cutting, perforating and any appropriate machining or material removing process.

Then, the clamping tab is formed through mechanical processing of the flange and used for securing the sealing element and the clamping element on the fluid collector.

According to another advantageous feature of the present invention, two flanges in spaced-apart relationship can be formed and the receiving opening can be formed in a wall of the volume region in an area between the flanges. The flanges may hereby be formed in substantial parallel relation, but also in slightly diverging formation. These configurations enable easy clamping and pressing of sealing element and clamping element later by bending the clamping tabs, which need only be bent about these elements. When the flanges diverge, the clamping element can be better centered in relation to the receiving opening during assembly.

The afore-described benefits also apply here as the use of a single extruded profile as semi-finished product offers a number of design choices to best suit various demands. Thus, there is flexibility to adapt to any situation at hand. For example, clamping tabs may be placed above and below the receiving opening, respectively. The clamping element and the sealing element can thus be partly embraced from above and below by the clamping tabs. Also conceivable, of course, is the placement of two clamping tabs above and below the receiving opening so as to fully embrace the clamping element and the sealing element on both sides next to the cooling channel. Of course, other configurations and constructions of the clamping tabs may be conceivable as well.

According to another advantageous feature of the present invention, a fishplate can be formed from the flange through mechanical processing.

According to another advantageous feature of the present invention, further clamping tabs can be formed through mechanical processing for securement of an end piece.

These additional process steps again reinforce the flexibility and efficiency of the production process. The individual components of the fluid collector can be formed from the extruded profile as needed to thereby cover a broad design spectrum for use of a fluid collector according to the present invention. In addition, other functional parts, that have not been described as of yet, can be formed onto the extruded profile, e.g. attachment tabs for mounting the fluid collector to a vehicle frame or reinforcement elements. These elements may also be produced during extrusion and suitably configured through mechanical processing, as needed.

According to another advantageous feature of the present invention, at least one area of the volume region along a longitudinal extension thereof can be formed such as to produce a cross section which varies over a length of the volume region. As described above, the fluid collector can thus be produced with dimensions to best suit an available installation space and other constraints. Even the provision of depressions, e.g. for stiffening purposes, is conceivable locally or over the entire length of the fluid collector.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5a is a perspective cutaway view of the cooling arrangement of FIG. 1, depicting the attachment of an end piece for sealing off an end of the fluid collector;

FIG. 5b is a perspective view of the end piece of FIG. 5a;

FIG. 5c is another perspective view of the end piece of FIG. 5a;

FIG. 6a is a perspective view of a fluid collector according to the present invention; and FIG. 6b is a sectional view of a semi-finished product for producing a fluid collector.

DETAILED DESCRIPTION OF PREFERRED EMBODIMENTS

Figure 1:
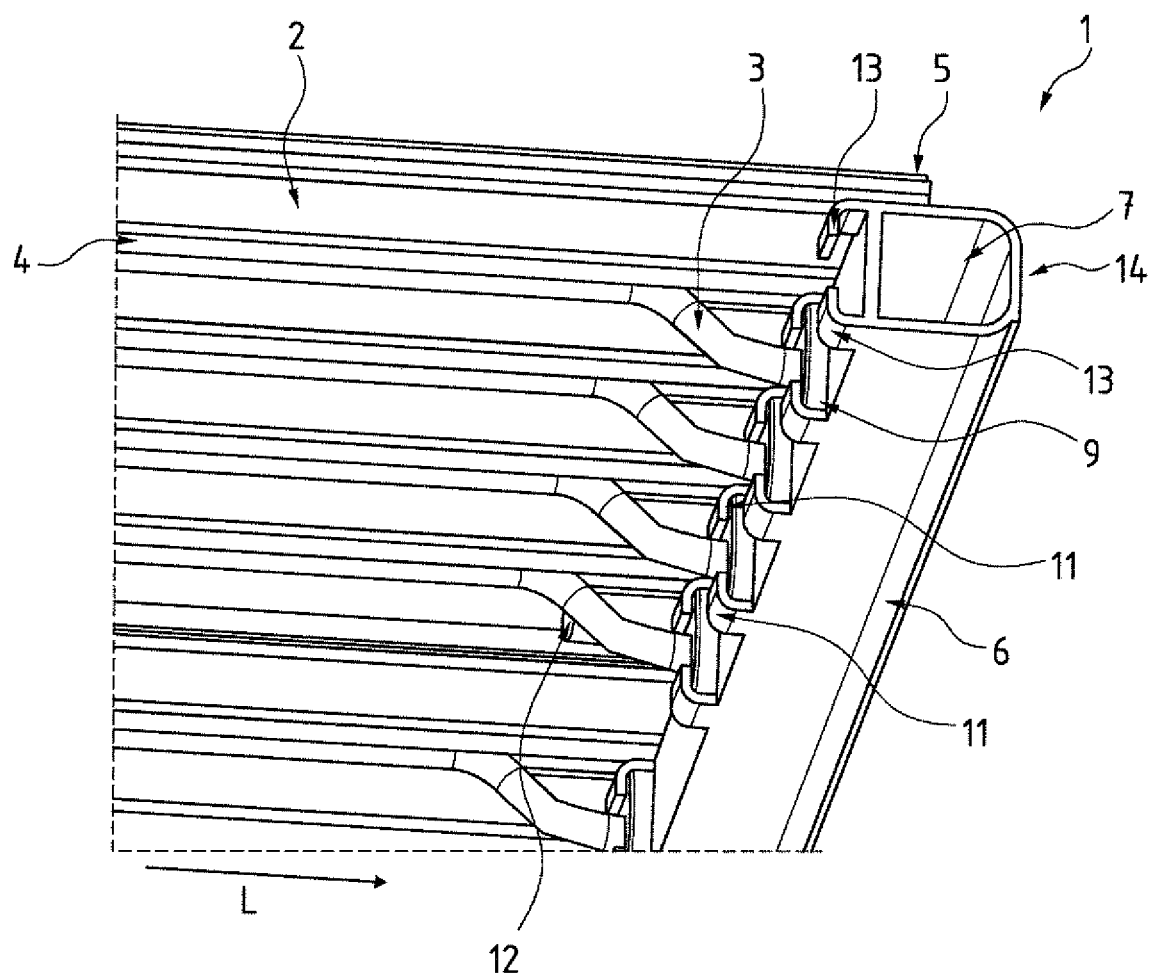
FIG. 1 is a perspective cutaway view of a cooling arrangement according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective cutaway view of a cooling arrangement according to the present invention, generally designated by reference numeral 1, for use in a battery box (not shown) for example. The cooling arrangement 1 includes a plate-shaped heat exchanging element 2 and several cooling channels 3 for transport of a fluid. The heat exchanging element 2 is embodied as a multipart extruded aluminum profile, as will be described further below in greater detail with reference to FIGS. 4a-4b.

The cooling channels 3 are secured to the heat exchanging element 2 via holders 4 which are formed in one piece with and of same material as the heat exchanging element 2. The holders 4 involve grooves with round cross section into which the cooling channels 3 can be pushed and held in position like a clip connection by an undercut. The cooling channels 3 extend in a direction of a longitudinal axis L from one axial end 5 of the heat exchanging element 2 to the other axial end (not shown).

Arranged at the one axial end 5 of the heat exchanging element 2 is a fluid collector 6. A like fluid collector may be arranged on the other, not shown, axial end. One fluid collector 6 can be used to distribute fluid to the individual cooling channels 3, whereas the other fluid collector can be used to collect the fluid again from the cooling channels 3 for subsequent transfer to a common discharge line. When supplied, the fluid is conducted through a volume region 7 which is formed with receiving openings 8 (not visible in FIG. 1) for insertion of the cooling channels 3, respectively. In this way, the volume region 7 is fluidly connected with the cooling channels 3.

The cooling channels 3 are immovably arranged and captivated on the fluid collector 6. For this purpose, a clamping element 9 and a sealing element 10 are provided and arranged outside of the fluid collector 6 to each of the receiving openings 8. As being completely surrounded by the clamping element 9, the sealing element 10 is not visible in FIG. 1. The fluid collector 6 has a wall 15 which surrounds the receiving opening 8 and forms together with the clamping element 9 a hollow space for accommodating the sealing element 10. A cooling channel 3 traverses the clamping element 9 and the sealing element 10 which thus are both provided with a recess. The clamping element 9 is made of stiff and fluidtight and gastight material, whereas the sealing element 10 is made of elastic material which is also fluidtight and gastight.

Arranged outside of the fluid collector 6 are clamping tabs 11 above and below each of the receiving openings 8. The clamping tab 11 of each receiving opening 8 embraces the clamping element 9 and the sealing element 10. A clamping force is hereby applied by the clamping tabs 11 upon the clamping element 9 and the sealing element 10 to press them against the fluid collector 6. The clamping element 9 presses against the sealing element 10, with the sealing element 10 undergoing elastic deformation 10. As a consequence, the diameter of the recess of the sealing element 10 that is traversed by the cooling channel 3 decreases and a press fit is established between the sealing element 10 and the cooling channel 3. The cooling channel 3 is thus held immovably upon the fluid collector 6. At the same time, the elastomeric sealing element 10 seals the receiving opening 8, sealed by the cooling channel 3, against the surroundings in a fluidtight and gastight manner.

There is no longer any need for a weld joint between cooling channel 3 and fluid collector 6, so that the cooling channels 3 can be made significantly thinner, i.e. with smaller diameter and smaller wall thickness and thus can be designed more lightweight.

The cooling arrangement 1 is assembled in such a way that first the cooling channels 3 are inserted through clamping element 9 and sealing element 10 into the receiving openings 8. Then, the protruding clamping tabs 11, which initially point away from the volume region 7 of the fluid collector 6 (see also FIG. 6b), are formed in direction of the receiving openings 8, i.e. bent over to thereby clamp clamping element 9 and sealing element 10 onto the fluid collector 6 and to secure the cooling channels 3 in the receiving openings 8, respectively. Subsequently, the cooling channels 3 are snap-fitted into the corresponding holders 4 of the heat exchanging element 2. Advantageously, any manufacturing tolerances of the aluminum profile of the heat exchanging element 2 and also of the fluid collector 6 are compensated by the individual, fairly flexible components.

Individual components of the cooling arrangement 1, such as the heat exchanging element 2, the cooling channels 3 and the fluid collector 6, can be made of different materials or different alloys, e.g. aluminum alloys. This allows selection of optimal materials for components to best suit the application at hand. The components may be designed independently to suit their use purpose, allowing the overall cooling arrangement 1 to be produced of optimal weight.

The fluid collector 6 is further provided with a fishplate 12 which is formed in one piece with and of same material as the fluid collector 6. The fishplate 12 is used to connect the fluid collector 6 with the heat exchanging element 2, e.g. by a material joint through bonding, welding or soldering or the like, or by a form fit, using bolts, rivets, or the like.

The fluid collector 6 has a terminal end 14 provided with further clamping tabs 13 for attachment of an end piece 21, as will be described further below in greater detail with reference to FIGS. 5a-5c.

Figure 2A:
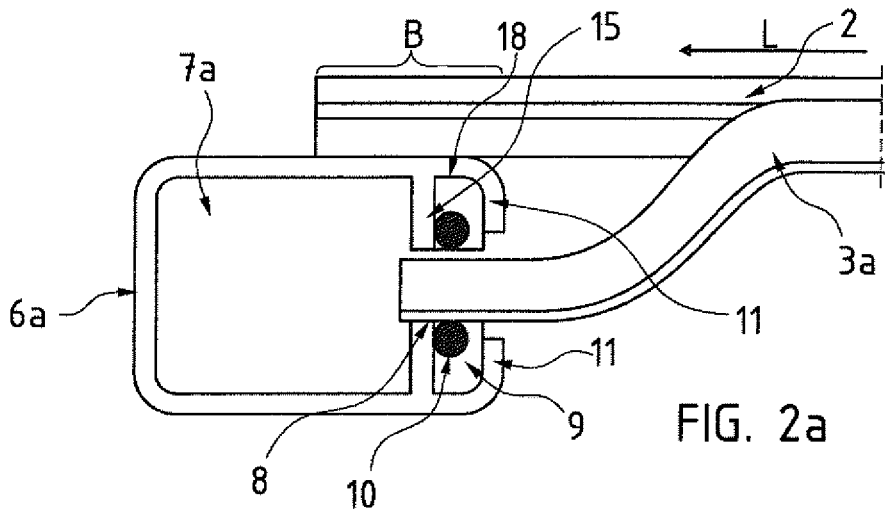
FIG. 2a is a schematic sectional view of a first variant of a fluid collector of the cooling arrangement.
Figure 2B:
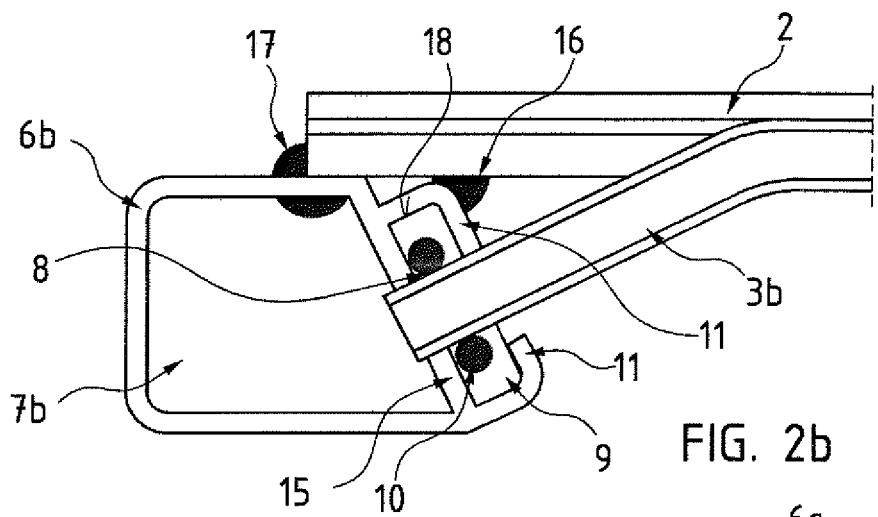
FIG. 2b is a schematic sectional view of a second variant of a fluid collector of the cooling arrangement.
Figure 2C:
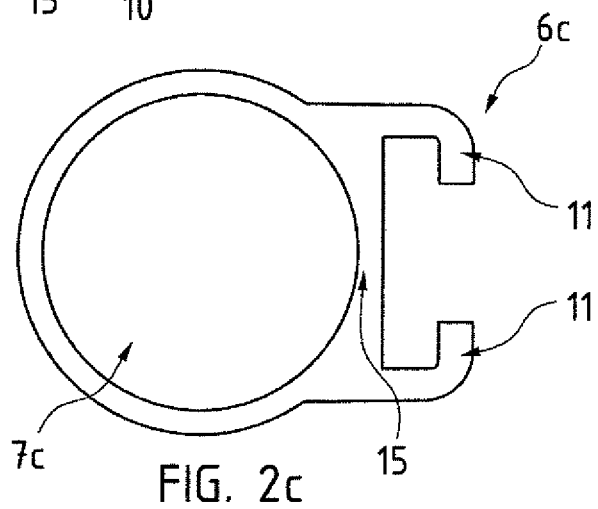
FIG. 2c is a schematic sectional view of a third variant of a fluid collector of the cooling arrangement.

Referring now to FIGS. 2a to 2c, there are shown three variants of a fluid collector 6 according to the present invention for a cooling arrangement according to the present invention. FIG. 2a shows a schematic sectional view of a first variant of a fluid collector, generally designated by reference numeral 6a. In the following description, parts corresponding with those in FIG. 1 will be identified, where appropriate for the understanding of the invention, by corresponding reference numerals followed by an "a". The fluid collector 6a has a volume region 7a of substantially rectangular cross section. The wall 15 of the fluid collector 6 is formed with receiving openings 8 between the clamping tabs 11 that point away from the volume region 7a for insertion of cooling channels 3a, respectively. The cooling channel 3a extends through an elastomer sealing element 10 and a stiff clamping element 9. The wall 15 and the clamping element 9 together form a hollow space 18 for accommodation of the sealing element 10. The sealing element 10 may be embodied as a simple, commercially available O ring of elastomer. The clamping tabs 11 embrace the sealing element 10 and the clamping element 9 and press them against the wall 15. In this variant, the fluid collector 6a can be secured to the heat exchanging element 2 without fishplate 2. The fluid collector 6a is connected here to the heat exchanging element 2 in an overlap zone B by establishing contact across the entire surface in the overlap zone B and, for example, bonding the fluid collector 6 to the heat exchanging element 2 in the overlap zone B. The cooling channel 3a has an S-shaped configuration. Such an S-shaped configuration can be realized before assembly of the cooling arrangement 1 or by a flexible construction of the cooling channels 3a.

FIG. 2b shows a schematic sectional view of a second variant of a fluid collector, generally designated by reference numeral 6b. In the following description, parts corresponding with those in FIG. 1 will be identified, where appropriate for the understanding of the invention, by corresponding reference numerals followed by an "b". In this embodiment, the cooling arrangement 1 has cooling channels 3b of simpler configuration. Each cooling channel 3b extends at an angle and away from the heat exchanging element 2 in a direction of the receiving opening 8 of the fluid collector 6b. The fluid collector 6b has a volume region 7b of trapezoidal configuration, defining a wall which points in the direction of the longitudinal axis L towards the heat exchanging element 2 and is formed with the receiving opening 8. The wall with the receiving opening 8 forms an oblique side of the trapeze and tilts towards the heat exchanging element 2. As a result of this design, there is less need for the cooling channel 3b to undergo deformation, when compared to the configuration of the cooling channel 3a in FIG. 2a. Such a design is beneficial when there is need for stiffer cooling channels 3b. At the same time, the fluid volume of the fluid collector 6 is greater so that a greater throughput of fluid becomes possible.

In the variant of FIG. 2b, the fluid collector 6b is connected with the heat exchanging element 2 via welded joints 16, 17, with welded joint 7 being applied on the end face at the axial end 5 of the heat exchanging element 7. The other weld joint 16 is applied in an area of the upper clamping tab 11 which virtually assumes here also the function of a fishplate 12.

In particular as a result of the configuration of the fluid collector 6b as extruded aluminum profile, many design choices can be created to best suit the available installation space or technical constraints.

FIG. 2c shows a schematic sectional view of a third variant of a fluid collector, generally designated by reference numeral 6c. In the following description, parts corresponding with those in FIG. 1 will be identified, where appropriate for the understanding of the invention, by corresponding reference numerals followed by an "c". In this embodiment, the cooling arrangement 1 has a volume region 7c of round cross section. The fluid collector 6c is shown here in the absence of other components, shown in FIGS. 2a, 2b for the sake of simplicity. The round cross section of the volume region 7c is beneficial as far as flow dynamics is concerned and in connection with a production using mechanical processing.

Figure 3A:
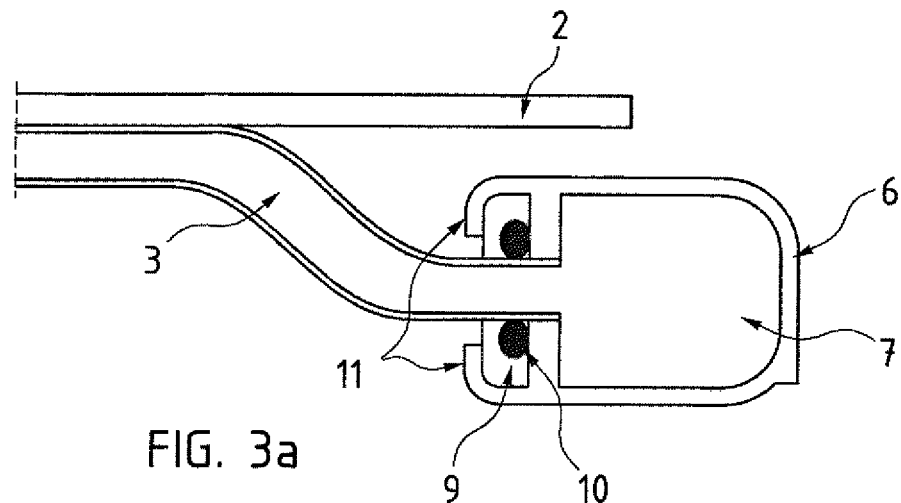
FIG. 3a is a schematic, cross sectional view of the cooling arrangement of FIG. 1 in an area of a cooling channel.
Figure 3B:
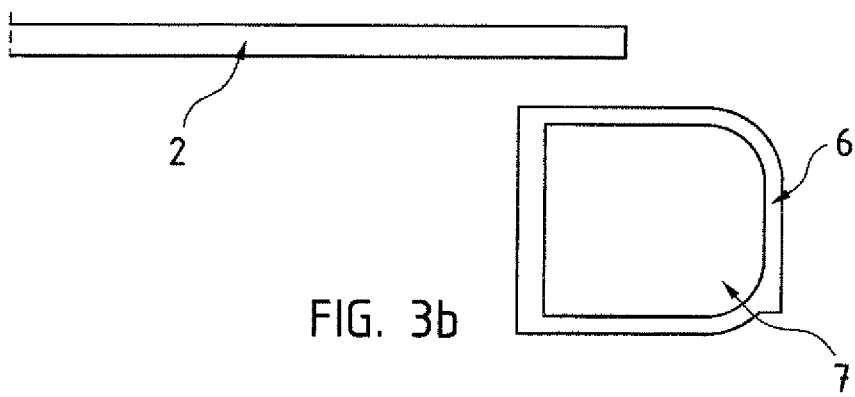
FIG. 3b is a schematic, cross sectional view of the cooling arrangement of FIG. 1 in an area away from a cooling channel.
Figure 3C:
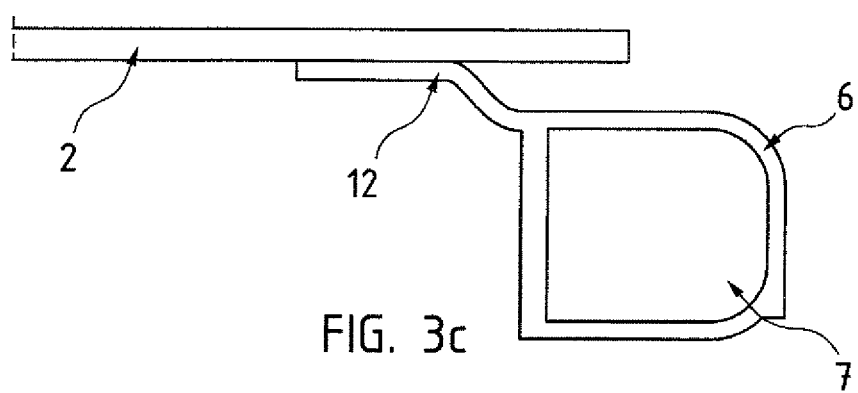
FIG. 3c is a schematic, cross sectional view of the cooling arrangement of FIG. 1 in an area of a fishplate.

Referring now to FIGS. 3a to 3c, there are shown three cross sectional views of a cooling arrangement 1 at three locations with section planes perpendicular to the longitudinal axis L of the heat exchanging element 2. FIG. 3a shows a schematic, cross sectional view of the cooling arrangement 1 of FIG. 1 in an area of a cooling channel 3, whereas FIG. 3b shows a schematic, cross sectional view of the cooling arrangement 1 of FIG. 1 in an area away from a cooling channel 3, and FIG. 3c shows a schematic, cross sectional view of the cooling arrangement 1 of FIG. 1 in an area of a fishplate 12. Function and characteristics of these components have been described above in particular with reference to FIG. 1, and are not repeated again for sake of simplicity.

Figure 4A:
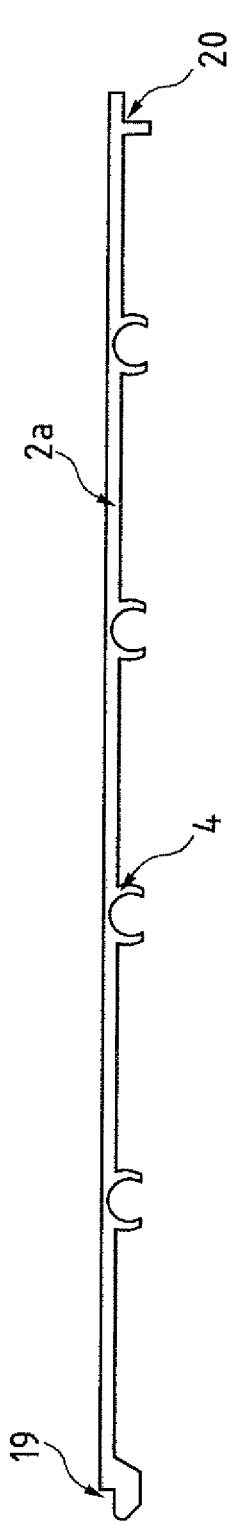
FIG. 4a is a schematic illustration of a single profile for a heat exchanging element.
Figure 4B:
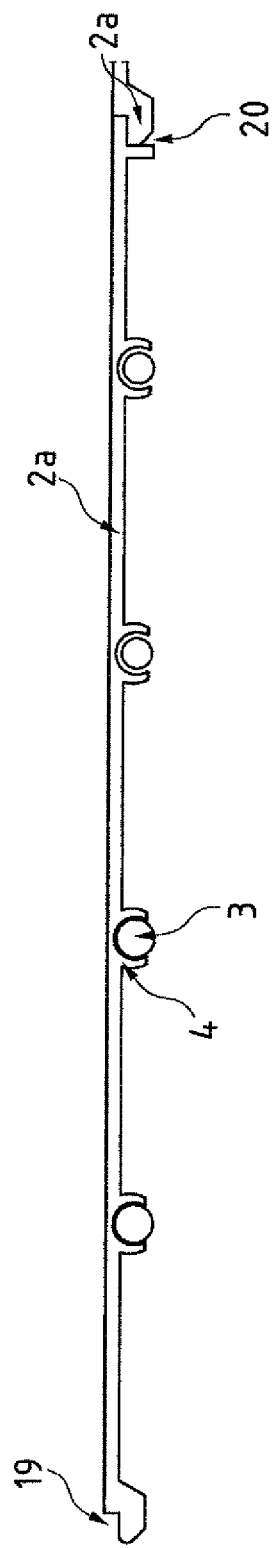
FIG. 4b is a schematic illustration of the single profile when installed in a cooling arrangement.

FIGS. 4a and 4b show schematic illustrations of a single profile 2a for a heat exchanging element 2 as extruded aluminum profile. FIG. 4a shows the profile 2a as such, whereas FIG. 4b shows the profile 2a when assembled in a cooling arrangement 1, not shown in greater detail. The profile 2a has first and second coupling sections 19, 20 which complement one another, so that a number of profiles 2a can be linked to one another via the coupling sections 19, 20, as indicated in FIG. 4b. In this way, it becomes possible to best suit a heat exchanging element 2, comprised of several identical profiles 2a, to the particular size of a battery box at hand. Battery boxes are used in various motor vehicle segments of varying dimensions. A cooling arrangement 1 can thus now be produced in such a way as to conform to the dimensions of the battery boxes by appropriate selection of a number of profiles 2a and thus can be tailored to different vehicle segments. The individual profiles 2a are identical, thus requiring only production of one profile geometry. Scaling of the heat exchanging element 2 is realized by the number of individual profiles and their length.

Corresponding fluid collectors 6 are also substantially identical in their geometry and differ for various vehicle segments ideally only in their length. This can easily be realized through appropriate cutting to length during the extrusion process.

The profiles 2a have holders 4 for the cooling channels 3, with the holders 4 being produced of same material as and in one piece with the profiles 2a during the production process. Production becomes efficient in view of the absence of additional production processes and joining steps. The cooling channels 3 are simply snapped or pressed into the holders 4 by this type of clip connection. Of course, certain zones or even the entire length of the channel-like holders 4 may be bonded, soldered or welded or secured by other mechanical connections, such as brackets or clamps, so as to hold captive the cooling channels 3 in the holders 4.

The heat exchanging element 2 may be part of the bottom of a battery box, in which case the holders 4 further ensure stiffness of the battery box.

Furthermore, a heat conducting layer, e.g. a heat conducting paste, may be arranged between the cooling channels 3 and the holders 4 to thereby optimize a heat transfer.

Turning now to FIG. 5a, there is shown a perspective cutaway view of the cooling arrangement 1 of FIG. 1, depicting the attachment of an end piece 21 for sealing off an end of the fluid collector 6. As shown in particular in FIGS. 5b and 5c, which illustrate different perspective views of the end piece 21, the end piece 21 includes a connecting portion 22 and a fitting 23. The connecting portion is attached to the end 14 of the fluid collector 6 and held captive by additional clamping tabs 13.

The connecting portion 22 has two arms 24, 25 which are connected by a bridge 26 and made in one piece. Threaded sleeves 27, 28 are formed on the arms 24, 25, respectively. The arm 24 faces the heat exchanging element 2 and has a free end with a recess 29 having a console 30. In addition, the bridge 26 has a through opening 31 sized to extend to the arm 24 which faces the heat exchanging element 2, with a console 32 being formed at the through opening 31. The connecting portion 22 is first placed onto the end 14 of the fluid collector 6, so that both arms 24, 25 together with the bridge 26 surround the end 14 of the fluid collector 6. The further clamping tabs 13 initially traverse the through opening 31 and the recess 29. The further clamping tabs 13 are then bent over to embrace the respective consoles 30, 32 so as to securely clamp the connecting portion 22 on the fluid collector 6.

The fitting 23 is then secured by bolts 33, 34 via the threaded sleeves 27, 28 onto the connecting portion 22. The connecting portion 22 is also designed as extruded profile that is subsequently finished mechanically to produce thread, recess 29 and through opening 31. the threaded sleeves 27, 28 can be formed in one piece with and of same material as the connecting portion 22 and there is no need to hold the threaded sleeves 27, 28 on the fluid collector 6 over its entire length during production thereof. This saves weight and/or reduces production costs. The fitting 33 is further provided with an attachment zone 35 for attachment of a fluid supply line or fluid discharge line.

When an end 14 of the fluid collector 6 should be closed off in its entirety, the use of a connecting portion 22, as described above, may be used. To close off the fluid collector 6, a structure is being used which has a similar fitting 23 but without attachment zone 35 and thus without opening. Such a structure may be threadably engaged to the connecting portion 22 and may be designated in general as an end piece 21 as well.

FIG. 6a shows again a perspective view of a fluid collector 6 according to the present invention with volume region 7, receiving openings 8 for receiving cooling channels 3 in a wall 15 of the fluid collector 6, clamping tabs 11 arranged above and below the receiving openings 8, fishplates 12, and further clamping tabs 13 for securing an end piece 21.

FIG. 6b is a sectional view of a semi-finished product for producing a fluid collector 6 after the extrusion process, depicting the clamping tabs 11 in their initial disposition in broken lines and their end position in continuous lines. The fluid collector 6 is first produced as extruded aluminum profile with at least one volume region 7 and two flanges arranged in spaced-apart relation and extending in a direction pointing away from the volume region 7. The flanges are then trimmed such as to establish the clamping tabs 11. Moreover, receiving opening 8 are then drilled or punched in a wall 15 of the fluid collector 6 above and below the clamping tabs 11. When attaching the cooling channels 3 to the fluid collector 6, the clamping tabs 11 are bent in bending direction R towards the receiving openings 8 in order to press the not shown clamping element 9 and sealing element 10 against the wall 15 about the receiving opening 8.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A cooling arrangement for a battery box, said cooling arrangement comprising:
a plate-shaped heat exchanging element;
a cooling channel secured to the plate-shaped heat exchanging element;
a fluid collector for collecting or feeding a fluid into the cooling channel, said fluid collector including a volume region and having a receiving opening on a side proximate to the cooling channel for insertion of the cooling channel to thereby fluidly connect the volume region with the cooling channel;
a seal arranged on an outside of the fluid collector at the receiving opening;
a clamping element arranged on the outside of the fluid collector at the receiving opening and traversed by the cooling channel;
a clamping tab arranged above or below the receiving opening in surrounding relationship to the seal and the clamping element to thereby secure the cooling channel immovably to the fluid collector; and
a fishplate formed hi one piece with and made of same material as the fluid collector for connecting the fluid collector with the plate-shaped heat exchanging element.

2. The cooling arrangement of claim 1, wherein the cooling channel is connected to the plate-shaped heat exchanging element by a form fit and/or material joint.

3. The cooling arrangement of claim 1, further comprising a holder formed in one piece with and made of same material as the plate-shaped heat exchanging element for receiving the cooling channel.

4. The cooling arrangement of claim 1, wherein the volume region has a cross section which is round or polygonal or varies over a length of the volume region.

5. The cooling arrangement of claim 1, wherein the fluid collector is made in one piece and uniformly produced of an aluminum alloy.

6. The cooling arrangement of claim 1, wherein the clamping tab, the fishplate, and the receiving opening are produced by mechanically processing an extruded profile.

7. The cooling arrangement of claim 1, further comprising an end piece attached to an end of the fluid collector to close off the fluid collector.

8. The cooling arrangement of claim 1, wherein the volume region has a variable diameter or with a variable cross sectional configuration.

9. The cooling arrangement of claim 5, wherein the fluid collector is produced by an extrusion process.

10. The cooling arrangement of claim 1, wherein the seal is made of a malleable material selected from the group consisting of elastomer, polymer, and another fluidtight and gastight material.

11. The cooling arrangement of claim 1, wherein the clamping element is made of a stiff material which is fluidtight and gastight.

12. The cooling arrangement of claim 1, wherein the cooling channel is secured to the fluid collector by a press fit.

13. The cooling arrangement of claim 12, wherein the press fit is formed between the cooling channel and the seal.

14. The cooling arrangement of claim 1, wherein the seal is arranged at the receiving opening and surrounded by the clamping element, with the clamping element and a wall of the fluid collector in surrounding relationship to the receiving opening defining a hollow space in which the seal is arranged.

15. The cooling arrangement of claim 1, wherein the seal and the clamping element jointly form a single-piece structure.

16. A cooling arrangement for a battery box, said cooling arrangement comprising:
a plate-shaped heat exchanging element;
a cooling channel secured to the plate-shaped heat exchanging element;
a fluid collector for collecting or feeding a fluid into the cooling channel, said fluid collector including a volume region and having a receiving opening on a side proximate to the cooling channel for insertion of the cooling channel to thereby fluidly connect the volume region with the cooling channel;
a seal arranged on an outside of the fluid collector at the receiving opening;
a clamping element arranged on the outside of the fluid collector at the receiving opening and traversed by the cooling channel;
a clamping tab arranged above or below the receiving opening in surrounding relationship to the seal and the clamping element to thereby secure the cooling channel immovably to the fluid collector, and
an end piece attached to an end of the fluid collector to close off the fluid collector, wherein the end piece includes a connecting portion having a threaded sleeve and attached to the end of the fluid collector, said fluid collector comprising a further clamping tab to hold the connecting portion captivated, said end piece further including a fitting for connection to a fluid supply line or fluid discharge line, said fitting being threadably engaged via the threaded sleeve to the connecting portion.

* * * * *